(12) United States Patent
Martinez

(10) Patent No.: US 11,117,509 B2
(45) Date of Patent: Sep. 14, 2021

(54) STRAP END MANAGER

(71) Applicant: Rodrigo Martinez, Hacienda Heights, CA (US)

(72) Inventor: Rodrigo Martinez, Hacienda Heights, CA (US)

(*) Notice: Subject to any disclaimer, the term of this patent is extended or adjusted under 35 U.S.C. 154(b) by 97 days.

(21) Appl. No.: 16/662,979

(22) Filed: Oct. 24, 2019

(65) Prior Publication Data

US 2021/0122288 A1    Apr. 29, 2021

(51) Int. Cl.
*B60P 7/08* (2006.01)

(52) U.S. Cl.
CPC .................. *B60P 7/0846* (2013.01)

(58) Field of Classification Search
CPC ........ B60P 7/0846; B60P 7/083; B60P 7/0869
See application file for complete search history.

(56) References Cited

U.S. PATENT DOCUMENTS

| | | | | |
|---|---|---|---|---|
| 4,120,437 A * | 10/1978 | Hara | ..... | A63C 11/025 24/306 |
| 6,776,528 B2 * | 8/2004 | Wills | ..... | A44B 18/00 294/137 |
| 6,896,458 B1 * | 5/2005 | Romero | ..... | B60P 7/0823 410/100 |
| 7,587,796 B1 * | 9/2009 | Schultz | ..... | B65D 63/10 24/16 R |
| 9,360,274 B2 * | 6/2016 | Horwitz | ..... | F41C 33/002 |
| 10,843,619 B1 * | 11/2020 | Carter | ..... | B60P 7/0853 |
| 2014/0250644 A1 * | 9/2014 | Thurlow | ..... | B60P 7/0846 24/69 CT |
| 2015/0336498 A1 * | 11/2015 | Hale | ..... | B60P 7/0846 24/129 B |
| 2018/0105093 A1 * | 4/2018 | Wood | ..... | B60P 7/0869 |

* cited by examiner

*Primary Examiner* — Robert Sandy
*Assistant Examiner* — Rowland Do
(74) *Attorney, Agent, or Firm* — Averill & Green; Kenneth L. Green

(57) ABSTRACT

A strap end manager holds a loose cargo strap end against a tight portion of the strap. The manage fits over an end of a loose strap, and the loose strap is wound around the manager. Top and bottom, right and left wings, fold around the strap and around the tight portion, and secure the wound loose end. The wings may include hook and loop material to retain the wings around the wound loose end. The strap end manager may further be used to facilitate storing cargo straps in the same manner as for holding loose cargo strap ends.

7 Claims, 5 Drawing Sheets

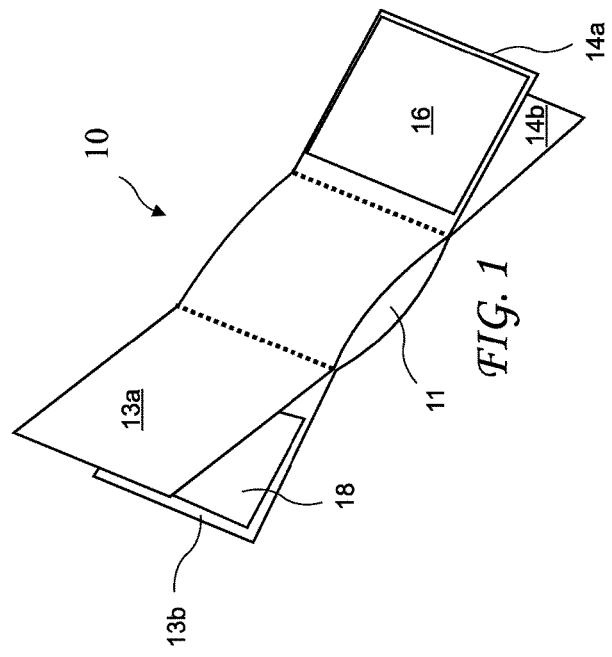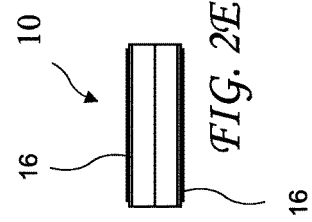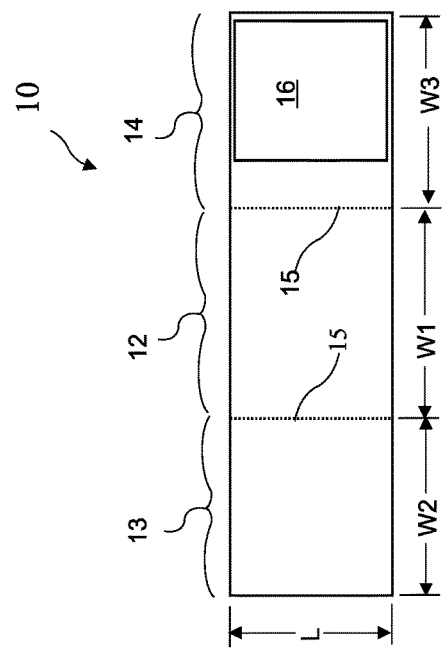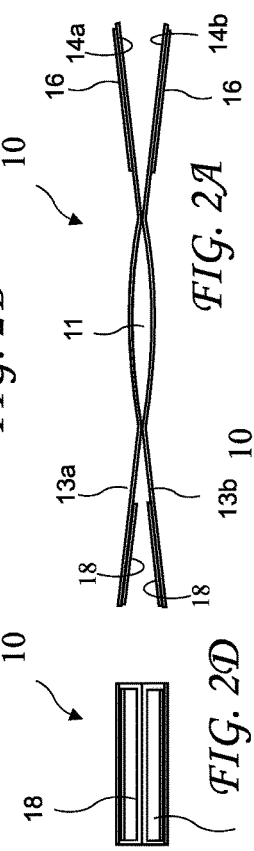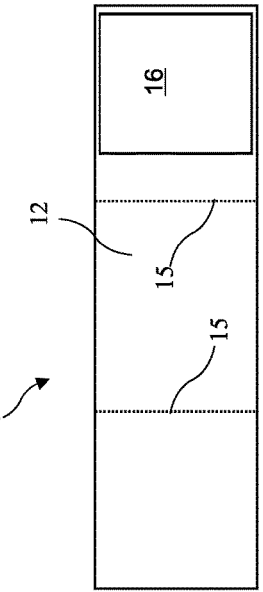

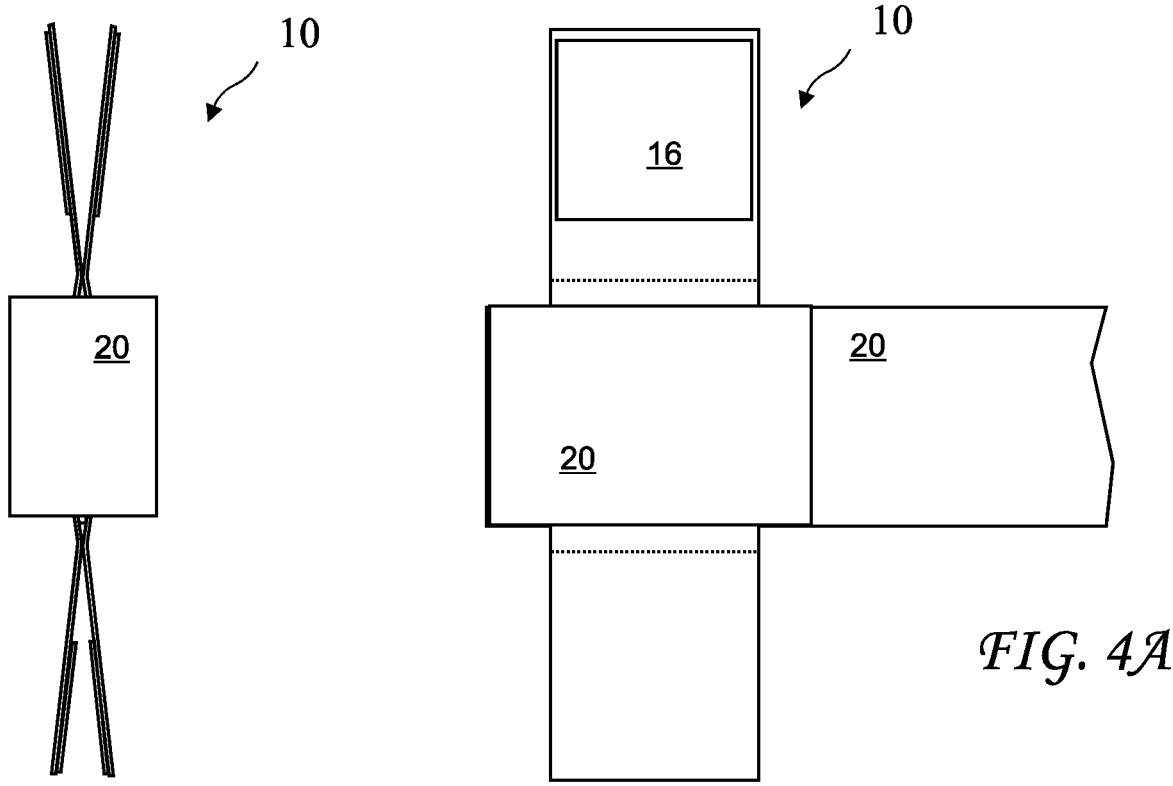
FIG. 4A
FIG. 4B
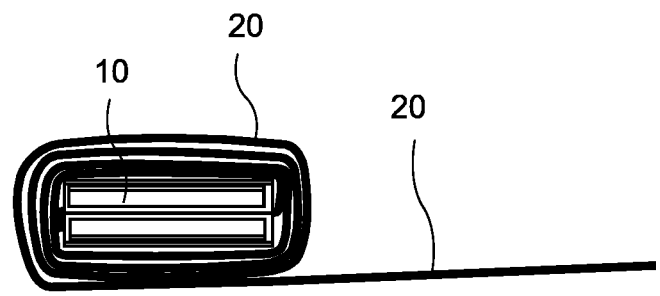
FIG. 4C

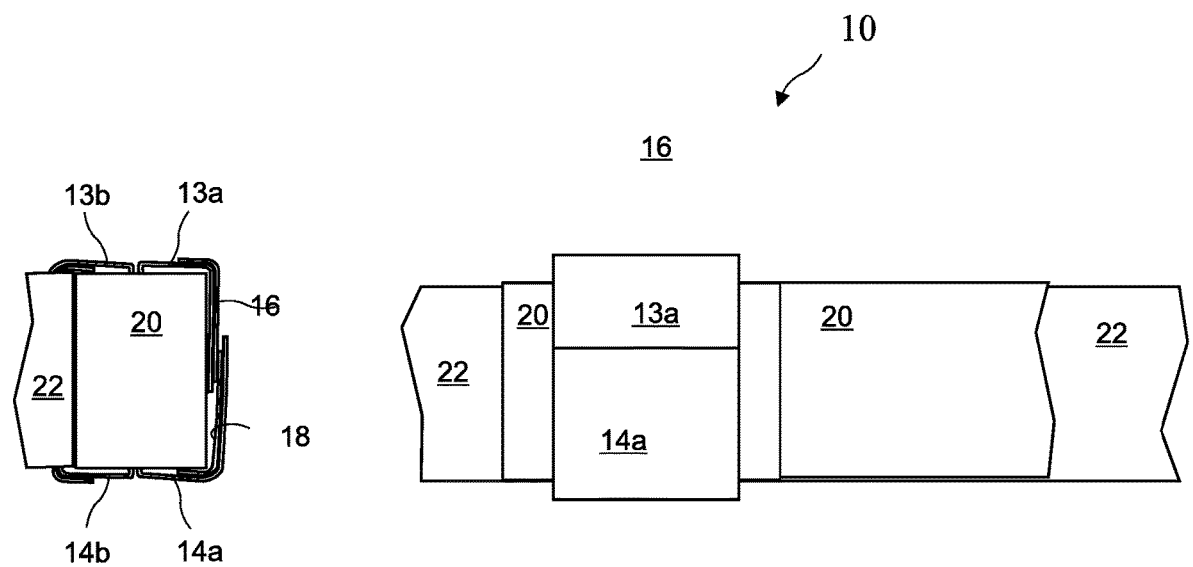
FIG. 5A
FIG. 5B
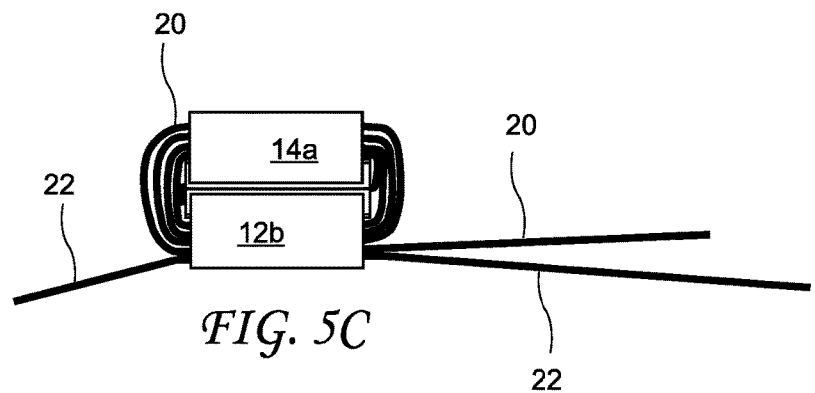
FIG. 5C

STRAP END MANAGER

BACKGROUND OF THE INVENTION

The present invention relates to cargo straps and in particular to strap manager used to gather and retain a loose strap end.

Cargo straps are commonly used to retain various items on trailers, truck beds, and inside trucks. The straps are generally longer than needed to allow use on various size items. When the straps are used on trailers and trucks, an unused portion of the strap generally hangs loose from a buckle, and often presents a problem if it can catch onto a stationary object, or wave in the wind.

BRIEF SUMMARY OF THE INVENTION

The present invention addresses the above and other needs by providing a strap end manager which holds a loose cargo strap end against a tight portion of the strap. The manager fits over an end of a loose strap, and the loose strap is wound around the manager. Top and bottom, right and left wings, fold around the strap and around the tight portion, and secure the wound loose end. The wings may include hook and loop material to retain the wings around the wound loose end. The strap end manager may further be used to facilitate storing cargo straps in the same manner as for holding loose cargo strap ends.

In accordance with one aspect of the invention, there is provided a strap end manager having a center portion with a mouth for insertion of a strap end, and wings on right and left sides of the mouth. A loose cargo strap end is wound around the center portion and then the wings are folder over the wound strap end and joined to hold the wound strap end.

In accordance with another aspect of the invention, there is provided a method for managing loose strap ends. The method includes inserting a loose strap end into a strap end manager, winding the loose strap end around the strap end manager, folding a right upper wing having first hook or loop material on an outer surface, over the wound strap end, folding a left upper wing having cooperating first hook or loop material on an inner surface, over the right upper wing, engaging the first hook and loop material, engaging the first hook and loop material with the cooperating first hook or loop material, folding a right lower wing having second hook or loop material on an outer surface, under the wound strap end, and a tightened portion of the strap, folding a left lower wing having cooperating hook or loop material on an inner surface, under the right lower wing, and engaging the second hook and loop material with the cooperating second hook or loop material.

In accordance with yet another aspect of the invention, there is provided a strap end manager for storing cargo straps. The cargo strap is wound around the center portion and then the wings are folder over the wound strap and joined to hold the wound strap.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a top and front view of a strap manager according to the present invention.

FIG. 2A shows a front view of the strap manager according to the present invention.

FIG. 2B shows a top view of the strap manager according to the present invention.

FIG. 2C shows a bottom view of the strap manager according to the present invention.

FIG. 2D shows a right side view of the strap manager according to the present invention.

FIG. 2E shows a left view of the strap manager according to the present invention.

FIG. 4A shows a top view of the strap manager according to the present invention with the strap wound around the strap manager.

FIG. 4B shows an end view of the strap manager according to the present invention with the strap wound around the strap manager.

FIG. 4C shows a side view of the strap manager according to the present invention with the strap wound around the strap manager.

FIG. 5A shows a top view of the strap manager according to the present invention with the strap wound around the strap manager and strap manager wings holding the strap.

FIG. 5B shows an end view of the strap manager according to the present invention with the strap wound around the strap manager and strap manager wings holding the strap.

FIG. 5C shows a side view of the strap manager according to the present invention with the strap wound around the strap manager and strap manager wings holding the strap.

Corresponding reference characters indicate corresponding components throughout the several views of the drawings.

DETAILED DESCRIPTION OF THE INVENTION

Figure 3A:
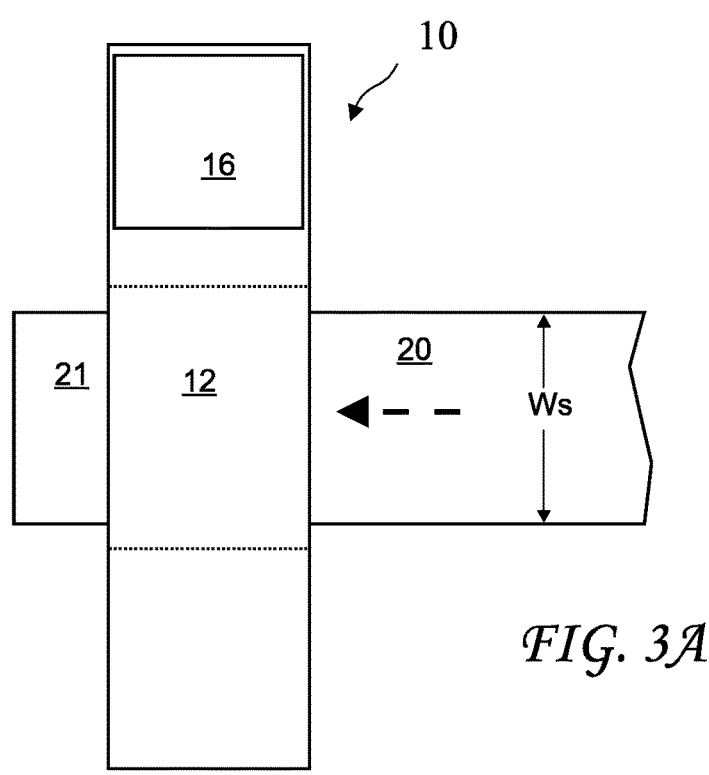
FIG. 3A shows a top view of the strap manager according to the present invention with a strap end inserted into a center section of the strap manager.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value. Where a shape is described as generally, the shape need not be precise and may have irregularities resulting from manufacturing, but is sufficient close to the described shape to provide the intended function.

A top and front view of a strap manager 10 according to the present invention is shown in FIG. 1, a front view of the strap manager 10 is shown in FIG. 2A, a top view of the strap manager 10 is shown in FIG. 2B, a bottom view of the strap manager 10 is shown in FIG. 2C, a right side view of the strap manager 10 is shown in FIG. 2D, and a left view of the strap manager 10 is shown in FIG. 2E. The strap manager 10 includes a center portion 12 having a mouth 11, and right and left wing portions 13 and 14. The wing portion 13 includes an upper right wing 13a and a lower right wing 13b, and the wing portion 14 includes an upper left wing 14a and a lower left wing 14b. Attaching material 16 is fixed to a top surface of the upper left wing 14a and to a bottom surface of the lower right wing 14b. Attaching material 18 is fixed to a bottom surface of the upper right wing 13a and to a top surface of the lower right wing 13b. The attaching material 16 and 18 is may be attached to any top or bottom surfaces of the wing portions 13 and 14 allowing attachment of the top wing 13a to the top wing 14a and the bottom wing 13b to the bottom wing 14b, as shown in FIGS. 5A-5C. The attaching material 16 and 18 is preferably hook and loop material.

The mouth 11 in the center portion 12 has a width W1 preferably between 1/8 and 1/2 inches wider than a strap width Ws (see FIG. 3A), and the width W1 is more preferably about 1/4 inches wider than the strap width Ws for narrow straps, and 1/2 inch wider than the strap for a wide and thicker strap 20. For example, the width W1 is preferably 1 1/4 inches for a one inch wide strap 20, 2 1/4 inches for a two inch wide strap 20, and preferably 4 1/2 inches for a four inch wide strap 20. The wing portions have widths W2 and W3 preferably between 1/2 and one inch wider than the strap width Ws. For example, the widths W2 and W3 are preferably 1 5/8 inches for a one inch wide strap 20, 2 7/8 inches for a two inch wide strap 20, and preferably 4 1/4 inches for a four inch wide strap 20. The strap manager 10 has a length L of preferably between 1 1/2 and 2 1/2 inches, and more preferably about two inches, and is preferably made of the same material or the like, as the strap 20.

Figure 3B:
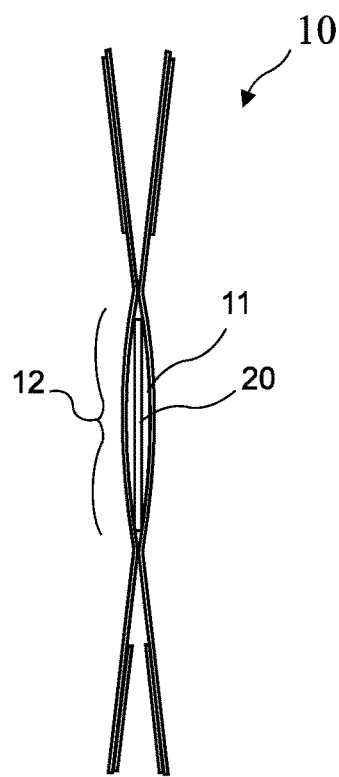
FIG. 3B shows an end view of the strap manager according to the present invention with the strap end inserted into the center section of the strap manager.
Figure 3C:
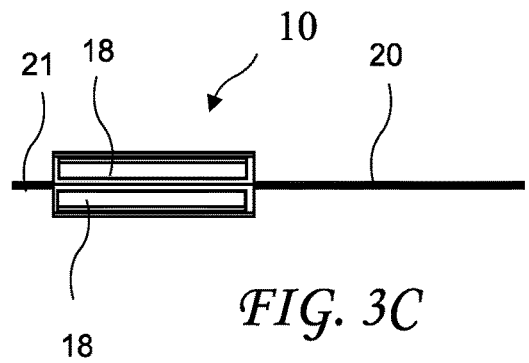
FIG. 3C shows the side view of the strap manager according to the present invention with a strap end inserted into the center section of the strap manager.

A top view of the strap manager 10 with a strap end 21 of the strap 20 inserted into the mouth 11 is shown in FIG. 3A, an end view of the strap manager 10 with the strap end 21 inserted into the mouth 11 of the strap manager 10 is shown in FIG. 3B, and a side view of the strap manager 10 with the strap end 21 inserted into the mouth 11 is shown in FIG. 3B.

A top view of the strap manager 10 with the strap 20 wound around the strap manager is shown in FIG. 4A, an end view of the strap manager 10 with the strap 20 wound around the strap manager is shown in FIG. 4B, and a side view of the strap manager 10 with the strap 20 wound around the strap manager is shown in FIG. 4C.

A top view of the strap manager 10 with the strap 20 wound around the strap manager and strap manager wings 13 and 14 holding the strap 20 is shown in FIG. 5A, an end view of the strap manager 10 with the strap 20 wound around the strap manager and strap manager wings 13 and 14 holding the strap 20 is shown in FIG. 5B, and a side view of the strap manager 10 with the strap 20 wound around the strap manager and strap manager wings 13 and 14 holding the strap 20 is shown in FIG. 5C. The attaching materials 16 and 18 are pressed together to retain the wings 13 and 14 over the wound strap 10. The lower wings 13b and 14b further are around a tight strap portion 22. The attaching materials 16 and 18 are preferably cooperating hook and loop material or the like, but may be buckles, snaps, button, ties, or any suitable attachment. The strap manager 10 may be two pieces of strap material attached by stitching 15 to separate the wings 13 and 14 from the center portion 12, and in some embodiments, the wings 13 and 14 and/or the entire strap manager 10 may be made of an elastic material.

Figure 6:
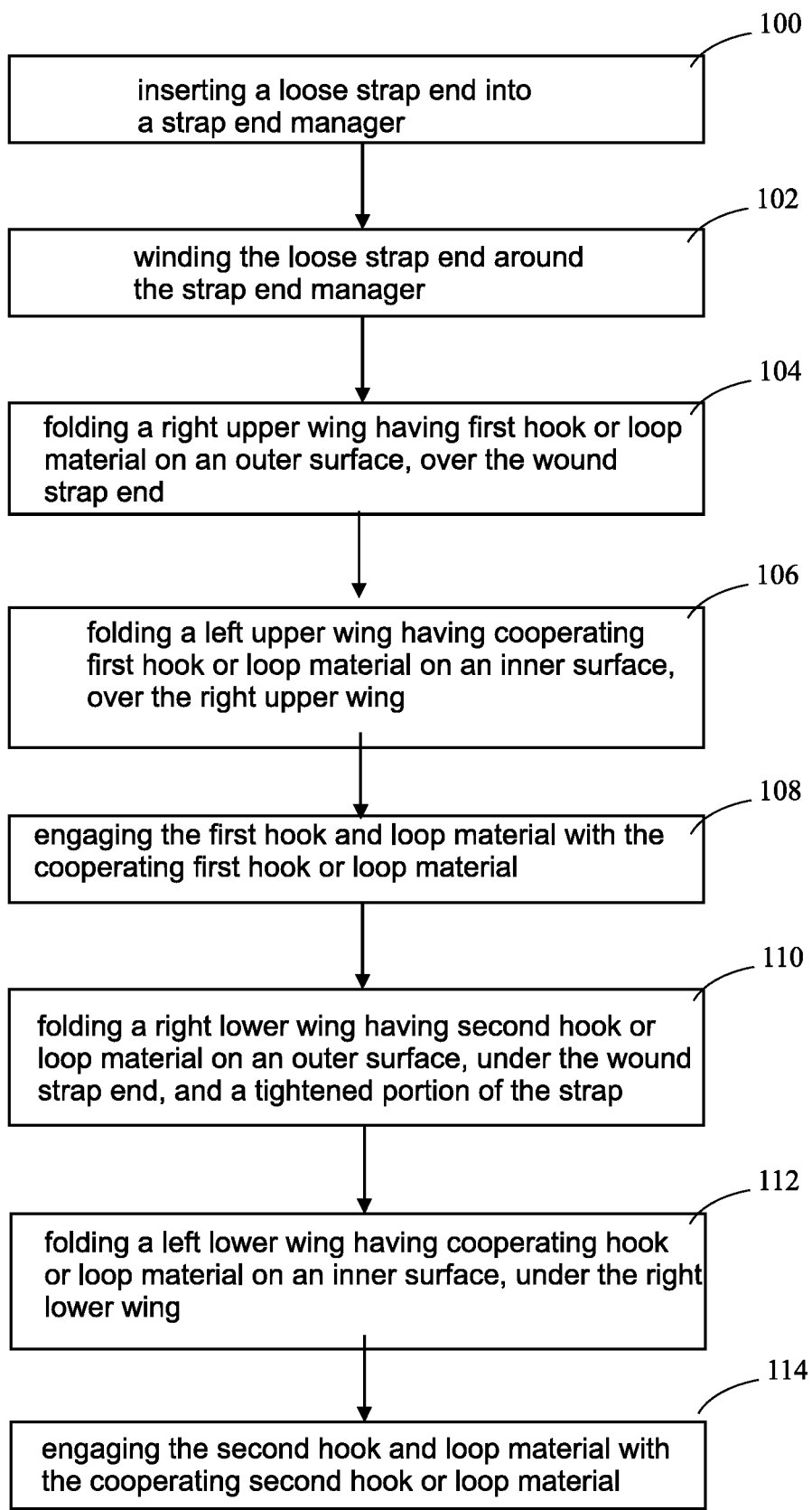
FIG. 6 shows a method for securing a lose strap end according to the present invention.

FIG. 6 shows a method for securing a lose strap end according to the present invention. The method includes inserting a loose strap end into a strap end manager at step 100, winding the loose strap end around the strap end manager at step 102, folding a right upper wing having first hook or loop material on an outer surface, over the wound strap end at step 104, folding a left upper wing having cooperating first hook or loop material on an inner surface, over the right upper wing at step 106, engaging the first hook and loop material, engaging the first hook and loop material with the cooperating first hook or loop material at step 108, folding a right lower wing having second hook or loop material on an outer surface, under the wound strap end, and a tightened portion of the strap at step 110, folding a left lower wing having cooperating hook or loop material on an inner surface, under the right lower wing at step 112, and engaging the second hook and loop material with the cooperating second hook or loop material. at step 114. Those skilled in the art will recognize that the hook and loop material may be replaced by buckles, snaps, button, ties, or any suitable attachment and a strap end manager utilizing any attachment type to connect the wings is intended to come within the scope of the present invention The strap manager 10 may further be used to store cargo straps using the method of FIG. 6, however, the lower wings are not wrapped around a tightened strap portion.

While the invention herein disclosed has been described by means of specific embodiments and applications thereof, numerous modifications and variations could be made thereto by those skilled in the art without departing from the scope of the invention set forth in the claims.

I claim:

1. A method for securing a strap material, the method comprising:
   inserting the strap material into a mouth of a strap manager;
   winding the strap material around the strap manager;
   folding a right upper wing having a first attaching material, over the wound strap material;
   folding a left upper wing having a first cooperating attaching material, over the right upper wing;
   engaging the first attaching material with the first cooperating attaching material to hold a portion of the wound strap material;
   folding a right lower wing having a second attaching material, under the wound strap material;
   folding a left lower wing having a second cooperating attaching material, under the right lower wing; and
   engaging the second attaching material with the second cooperating attaching material to hold a remaining portion of the wound strap material not held by the right and left upper wings.

2. The method of claim 1, wherein:
   folding the right upper wing having the first attaching material over the wound strap material comprises folding the right upper wing having a first hook and loop material over the wound strap material;
   folding the left upper wing having the first cooperating attaching material over the right upper wing comprises folding the left upper wing having a first cooperating hook and loop material over the right upper wing;
   engaging the first attaching material with the first cooperating attaching material comprises engaging the first hook and loop material with the first cooperating hook and loop material;
   folding the right lower wing having the second attaching material under the wound strap material comprises folding the right lower wing having a second hook and loop material under the wound strap material;

folding the left lower wing having the second cooperating attaching material under the right lower wing comprises folding the left lower wing having a second cooperating hook and loop material under the right lower wing; and engaging the second attaching material with the second cooperating attaching material comprises engaging the second hook and loop material with the second cooperating hook and loop material.

3. The method of claim 1, wherein:

the strap material is a loose strap end; and folding the right lower wing under the wound strap material and folding the left lower wing having the second cooperating attaching material under the right lower wing, comprises folding the right lower wing and left lower wing under the wound strap material and under a tightened portion of the strap.

4. The method of claim 1, wherein inserting the strap material into the mouth of the strap manager comprises wherein inserting a strap end into and through the mouth of the strap manager.

5. The method of claim 1, wherein:

folding the right upper wing having the first attaching material, over the wound strap material comprises folding the right upper wing attached to the mouth over the wound strap material;

folding the left upper wing having the first cooperating attaching material, over the right upper wing comprises folding the left upper wing attached to the mouth, over the right upper wing;

folding the right lower wing having the second attaching material, under the wound strap material comprises folding the right lower wing attached to the mouth, under the wound strap material; and folding the left lower wing having the second cooperating attaching material, under the right lower wing comprises folding the left lower wing attached to the mouth, under the right lower wing.

6. The method of claim 1, wherein:

folding the right upper wing having the first attaching material, over the wound strap material comprises folding the right upper wing permanently attached to the mouth over the wound strap material;

folding the left upper wing having the first cooperating attaching material, over the right upper wing comprises folding the left upper wing permanently attached to the mouth, over the right upper wing;

folding the right lower wing having the second attaching material, under the wound strap material comprises folding the right lower wing permanently attached to the mouth, under the wound strap material; and folding the left lower wing having the second cooperating attaching material, under the right lower wing comprises folding the left lower wing permanently attached to the mouth, under the right lower wing.

7. A method for securing a loose strap end, the method comprising:

inserting the loose strap end into a mouth in a center portion of a strap end manager;

winding the loose strap end around the center portion of the strap end manager;

folding a right upper wing reaching from a right of the center portion and having a first hook and loop material, over the wound loose strap end;

folding a left upper wing reaching from a left of the center portion and having a first cooperating hook and loop material, over the right upper wing;

engaging the first hook and loop material with the first cooperating hook and loop material over the wound loose strap end to hold a portion of the wound loose strap end;

folding a right lower wing reaching from the right of the center portion and having a second hook and loop material, under the wound loose strap end and under a tightened portion of a strap;

folding a left lower wing reaching from the left of the center portion and having a second cooperating hook and loop material, under the right lower wing; and engaging the second hook and loop material with the second cooperating hook and loop material under the wound loose strap end and under the tig htened portion of the strap to hold a remaining portion of the wound loose strap end not held by the right and left upper wings, and holding the tightened portion of the strap against the wound loose strap end.

* * * * *